United States Patent [19]

Low et al.

[11] 3,710,257

[45] Jan. 9, 1973

[54] MULTICHANNEL TELEMETRY SYSTEM

[76] Inventors: George M. Low, Acting Administrator of the National Aeronautics and Space Administration with respect to an invention of; Stanley Butman; Uzi Timor, both of Pasadena, Calif.

[22] Filed: March 17, 1971

[21] Appl. No.: 125,234

[52] U.S. Cl. ............325/60, 179/15 AN, 179/15 BC, 343/200

[51] Int. Cl. ..........................................H04j 9/00

[58] Field of Search....179/15 AN, 15 BL, 15 BM, 15 BC, 179/15 BB, 15 BY, 15 BT; 325/60; 340/182, 155, 207, 208, 351; 343/200

[56] References Cited

UNITED STATES PATENTS

| | | | |
|---|---|---|---|
| 3,030,449 | 4/1962 | Geneve | 179/15 BT |
| 3,603,882 | 9/1971 | Wilson | 179/15 BM |
| 3,343,093 | 9/1967 | Van Gerwen | 325/60 |
| 2,975,234 | 3/1961 | Le Blan | 179/15 BT |
| 3,619,501 | 11/1971 | Nussbaumer | 325/60 X |

*Primary Examiner*—Benedict V. Safourek
*Attorney*—Monte F. Mott, Paul F. McCaul and John R. Manning

[57] ABSTRACT

A two-channel telemetry system is disclosed in which one channel is used for high-rate data and the other channel for low-rate data communication. In the transmitter a signal, which subsequently phase modulates a carrier, is produced which is a function of at least the high-rate data, the low-rate data and the frequency of the subcarrier of the low-rate channel. In the receiver which includes a phase-locked loop, the high-rate data is detected off the receiver inphase channel output and the low-rate off the quadrature channel output.

21 Claims, 8 Drawing Figures

INVENTORS
STANLEY BUTMAN
UZI TIMOR
BY
ATTORNEYS

INVENTORS
STANLEY BUTMAN
UZI TIMOR
BY
ATTORNEYS

INVENTORS
STANLEY BUTMAN
UZI TIMOR
BY
Paul F. McCaul
Monte F. Mott
ATTORNEYS

MULTICHANNEL TELEMETRY SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention:

The present invention relates to a communication system and, more particularly, to an improved multichannel telemetry system.

2. Description of the Prior Art:

Space exploration has led to significant advances in the art of telemetry. Due to the large amount of data from different sources, which needs be communicated, multichannel telemetry systems have been developed. One known system is a two-channel telemetry system in which one channel is used for high-rate scientific data and the other for low-rate engineering data.

As is appreciated by those familiar with the art such a system suffers from a significant power loss due to intermodulation between the two channels. Typically, the intermodulation loss is greater than the power allocated to the low-rate channel. Also the amount of carrier power which must be allocated in such a prior art system is far in excess of the amount which is actually needed from the carrier tracking point of view. These power losses greatly lower the system's efficiency.

One way of reducing losses is to time multiplex the data from the two channels. Such a system requires a common receiver for both channels, which in many applications is not desirable, since failure of the single receiver would affect all the data from both channels. In these applications separate channel receivers are required to insure that failure of one channel receiver does not affect the data received from the other channel by the other receiver. A need therefore exists for a new, improved multichannel telemetry system, in which data from each channel is received by a separate receiver and which is more efficient than prior art systems.

OBJECTS AND SUMMARY OF THE INVENTION

It is a primary object of the present invention to provide a new improved multichannel telemetry system.

Another object of the present invention is to provide a new improved multichannel telemetry system with separate receiver means for each channel.

A further object of the present invention is to provide a new improved multichannel telemetry system with reduced power loss.

Still a further object of the present invention is the provision of a new multichannel telemetry system in which power allocation for the carrier is limited to the amount actually needed and the power loss is minimized.

Yet a further object of the present invention is to provide a multichannel telemetry system in which the intermodulation power loss, characteristics of a related prior art system, represents the power of a low-rate channel and the power loss is minimized.

These and other objects of the present invention are realized in one two-channel embodiment of the invention by multiplying the low-rate data by the high-rate data in the transmitter. This multiplication can be performed by multiplying the high-rate data after it has been phase modulated onto the high-rate channel subcarrier by the low-rate data after it has been phased modulated onto the low-rate channel subcarrier. Then the phase modulated high-rate channel subcarrier and the product of phase modulated high-rate channel subcarrier and the phase modulated low-rate channel subcarrier are combined linearly and used to phase modulate the carrier for transmission. In another embodiment the high-rate data is multiplied by the low-rate data before either data phase modulates its respective channel subcarrier. Then the high-rate data phase modulates the high-rate channel subcarrier and the product of the high-rate data and the low-rate data phase modulates the low-rate channel subcarrier. Thereafter, the two are combined linearly and used to phase modulate the carrier, as in the first embodiment.

In the receiver in which a phase-locked loop (PLL) is used to track the carrier, the inphase channel receiver output is used for detecting the high-rate data and the quadrature channel receiver output, which herebefore was wasted, since it was not used for data detection, is used for the detection of the low-rate data.

The novel features of the invention are set forth with particularity in the appended claims. The invention will best be understood from the following description when read in conjunction with the accompanying drawings.

DESCRIPTION OF THE PREFERRED EMBODIMENTS

In order to fully appreciate the features and advantages of the present invention, it is believed that the prior art should first be discussed briefly, for subsequent comparison with the present invention. The prior art will be explained in conjunction with a two-channel telemetry system, with the transmitter being shown in FIG. 1 and the receiver in FIG. 2.

Figure 1:
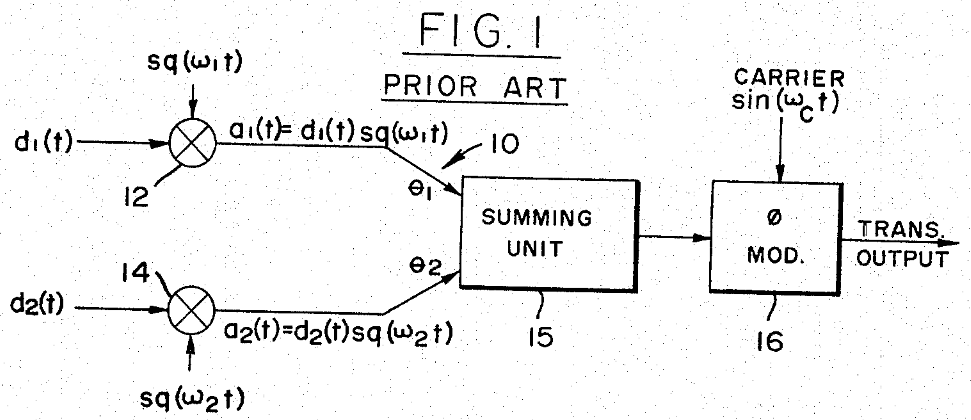
FIGS. 1 and 2 are block diagrams of a prior art two-channel transmitter and receiver respectively.
Figure 2:
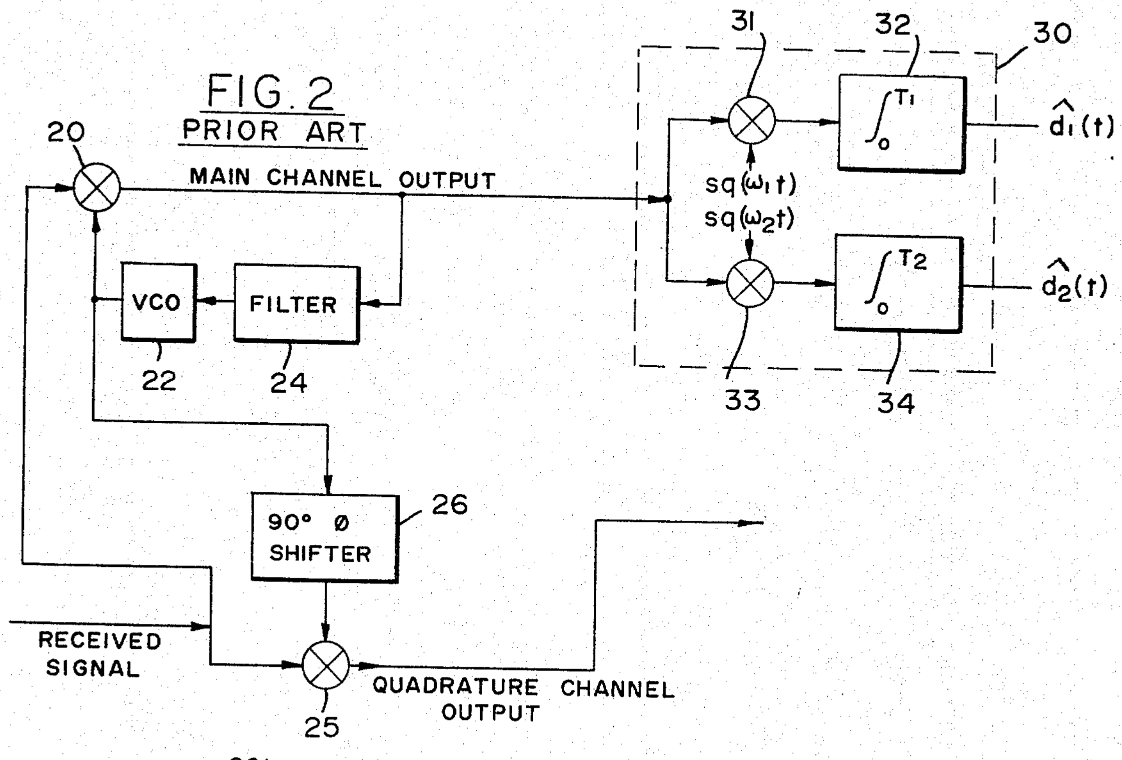

As is known, in the prior art two-channel transmitter, designated by numeral 10 in FIG. 1, high-rate data, designated $d_1(t)$, phase modulates a high-rate channel subcarrier $SC_1$ in a mixer 12, while low-rate data $d_2(t)$ likewise phase modulates a low-rate channel subcarrier $SC_2$ in a mixer 14. The outputs of the two mixers are linearly combined by a summing unit 15, whose output phase modulates a carrier C in a modulator 16, whose output is the transmitted signal. The two subcarriers $SC_1$ and $SC_2$ are typically squarewaves which can be expressed $sq(\Omega_1 t)$ and $sq(\Omega_2 t)$ and the carrier can be expressed as $\sin(\Omega_c t)$.

The transmitted output can be expressed as $$X(t) = \sqrt{2P}\sin[\,\Omega_c t + \theta_1 a_1(t) + \theta_2 a_2(t)\,],$$

where $P$ is the total transmitted power, $\theta_1$ and $\theta_2$ are the modulation angles, the $a_1(t) = d_1(t sq(\Omega_1 t)$ and $a_2(t) = d_2(t\Omega_2 t)$. The total power is the sum of four components and it can be expressed as $$P = P_1 + P_y + P_x + P_c$$

where $$P_1 = P(\sin\theta_1\cos\theta_2)^2$$

$$P_y = P(\cos\theta_1\sin\theta_2)^2$$

$$P_x = P(\sin\theta_1\sin\theta_2)^2$$

$$P_c = P(\cos\theta_1\cos\theta_2)^2.$$

In the prior art $P_1$ is the power in the high-rate data channel $P_y = P_2$ is the power in the low-rate data channel $P_x = P_L$ is power which is lost due to cross modulation $P_c$ is the power in the carrier.

In the prior art the receiver (FIG. 2) consists of a phase-locked loop comprising a mixer 20 which mixes the received signal with the output of a voltage controlled oscillator (VCO) 22, which is controlled by the output of mixer 20 after it is filtered by a filter 24. The output of mixer 20 represents the receiver's main or inphase channel output, while the output of a mixer 25, which mixes the receiver input with the VCO output after the latter is phase shifted by 90° by a phase shifter 26 represents the receiver's quadrature channel output. The inphase channel output which can be expressed as $$\sqrt{P_1}\,a_1(t) + \sqrt{P_2}\,a_2(t)$$

is supplied to a bit detector 30, whose outputs are $\hat{d}_1(t)$ and $\hat{d}_2(t)$, where the symbol ^ represents the noise affected estimate of the signal. In practice, the bit detector 30 consists of two detection channels. In one, a mixer 31 mixes the inphase channel output with $sq(\Omega_1 t)$ and the mixer's output is integrated by a bit integrator 32, whose output is $\hat{d}_1(t)$. In the other detection channel a mixer 33 mixes the inphase channel output with $sq(\Omega_2 t)$, and the output of mixer 33 is integrated by a bit integrator 34 whose output is $\hat{d}_2(t)$.

The quadrature channel output, i.e., the output of mixer 25 may be expressed as $$\sqrt{P_c} + \sqrt{P_L}\,a_1(t)\,a_2(t).$$

Though the second term contains data and has significant power $P_L$ in the prior art it was never used for data detection, thereby representing wasted power. In the prior art the quadrature channel output, after filtering, was used only to indicate system lock.

In accordance with the present invention to reduce the inefficiency as represented by the wasted power, a new modulation-demodulation scheme is provided. In one embodiment of the present invention a transmitter 40, shown in FIG. 3 and wherein elements like those previously discussed are designated by like numerals, includes all the elements of the prior art transmitter 10 (FIG. 1). However, in addition it includes a mixer 41 which mixes the output of mixer 12, i.e., $a_1(t)$ with the output $a_2(t)$ of mixer 14. In the present invention it is $a_1(t)\mathrm{A}a_2(t)$ which is supplied to unit 15 rather than $a_2(t)$ as in the prior art.

In this particular embodiment of the invention, the transmitted signal is $$X'(t) = \sqrt{2P}\sin[\Omega_c t + \theta_1 a_1(t) + \theta_2 a_1(t) a_2(t)].$$

Like in the prior art $$P = P_1 + P_y + P_x + P_c.$$

However, in the present invention $P_x = P_2$ which is the power in the lowrate data channel.

$P_y = P_L$ which is the power lost due to cross-modulation.

As in the prior art, $P_1$ is the power in the high-rate data channel, and $P_c$ is the power in the carrier.

Like in the prior art receiver, in the receiver of the present invention (see FIG. 4) an inphase channel output and a quadrature channel output are provided. In the present invention, the inphase channel output which is the output of mixer 20 can be expressed as $$\sqrt{P_1}\,a_1(t) + \sqrt{P_L}\,a_1(t)a_2(t)$$

and the quadrature channel output which is the output of mixer 25 can be expressed as $$\sqrt{P_c} + \sqrt{P_2}\,a_2(t).$$

However, unlike the prior art receiver in which the inphase channel output is used for detecting both $d_1(t)$ and $d_2(t)$ and the quadrature channel output is not used for data detection at all, in the receiver of the instant embodiment, the inphase channel output is used for the detection of $d_1(t)$ only and the quadrature channel output is used for the detection of $d_2(t)$.

In the receiver of the instant embodiment, the inphase channel output is mixed by a mixer 51 (see FIG. 4) with the high-rate channel subcarrier $sq(\Omega_1 t)$. The output of this mixer which may be expressed as $$\sqrt{P_1}\,d_1(t) + \sqrt{P_2}\,d_1(t)\,d_2(t)\,sq(\Omega_2 t),$$

is integrated by bit integrator 52 over a bit period $T_1$ which is the bit period of the high-rate data $d_1(t)$. It should be stressed that in order for this output to represent $d_1(t)$, the second term of the above expression when integrated over $T_1$ should be zero. This is easily accomplishable by selecting $\Omega_2$, i.e., the frequency of the subcarrier for the low-rate channel to be equal to $N/T_1$ where N is an integer not less than 2.

In addition in accordance with the teachings of the present invention, the quadrature channel output $$\sqrt{P_c} + \sqrt{P_2}\,d_2(t)\,sq(\Omega_2 t)$$

is mixed in mixer 53 by $sq(\Omega_2 t)$, i.e., the low-rate channel subcarrier, thereby providing an output $$\sqrt{P_c}\,sq(\Omega_2 t) + \sqrt{P_2}\,d_2(t).$$

Thus, when the expression is integrated in the bit integrator 54 over the bit period $T_2$ of the low-rate data $d_2(t)$, the output is $\hat{d}_2(t)$ since the first term will integrate to zero.

Figure 4:
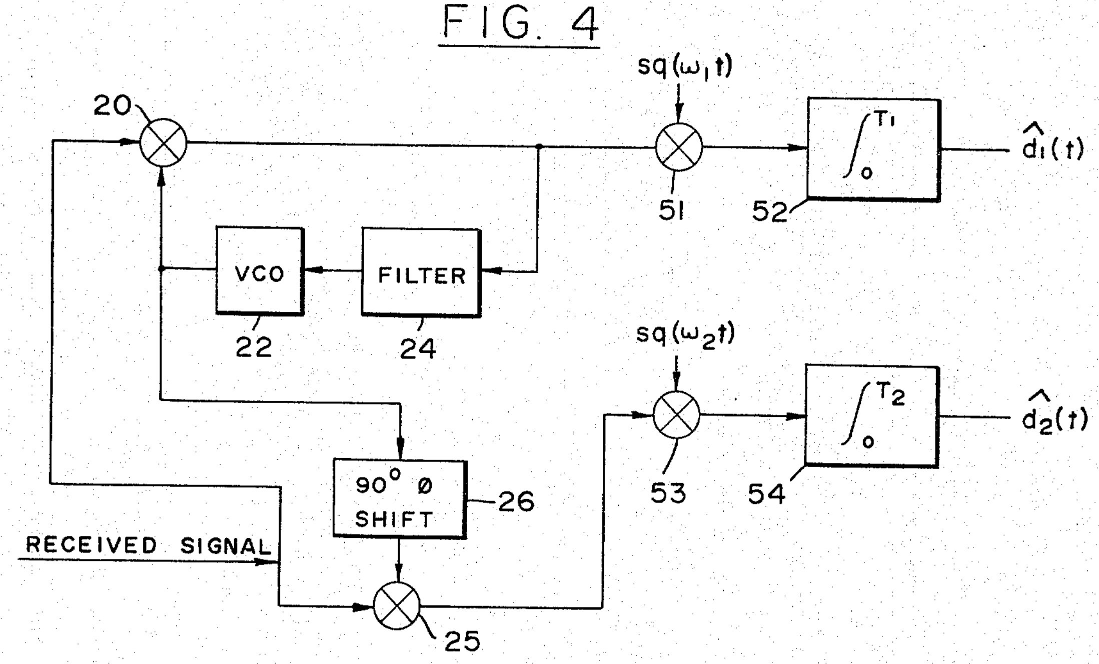

It should be pointed out that mixers 51 and 53 and integrators 52 and 54 in FIG. 4 perform analogous functions to those performed by mixers 31 and 33 and integrators 32 and 34 (FIG. 2) of the prior art. However, in the prior art all four units operate on the output of the inphase channel output, while in the present invention mixer 51 and integrator 52 operate to detect $d_1(t)$ in response to the inphase channel output, while mixer 53 and integrator 54 operate to detect $d_2(t)$ from the quadrature channel output.

It should be stressed that the unforseen advantages of the present invention are realizable at the cost of one mixer 41 which has to be added to the otherwise conventional two-channel transmitter. The number of units in the receiver of the present invention is the same as the number of units in the prior art receiver.

Figure 5:
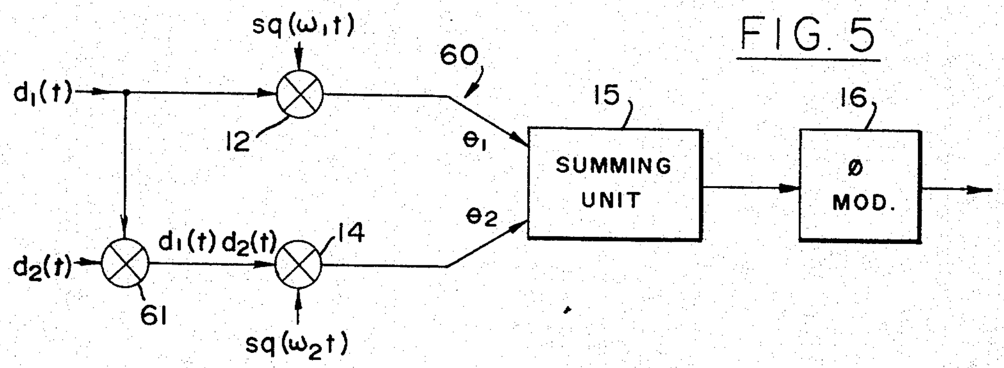
FIGS. 5 and 6 are block diagrams of a transmitter and receiver respectively of another two-channel telemetry system in accordance with the present invention.
Figure 6:
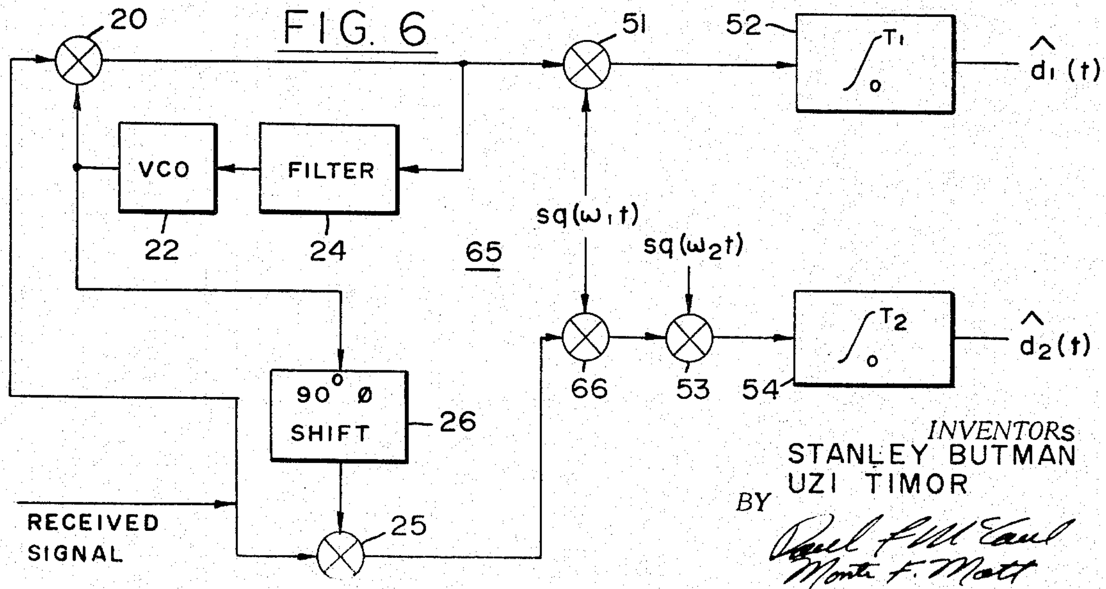

Reference is now made to FIGS. 5 and 6 which are diagrams of a transmitter and a receiver respectively, of another embodiment of the invention. In the transmitter 60 (FIG. 5) of the present embodiment, the high-rate data $d_1(t)$ is mixed in a mixer 61 with the low-rate data $d_2(t)$ before either data phase modulates its respective channel subcarrier. The rest of the transmitter is like the conventional transmitter 10. That is, $d_1(t)$ phase modulates $sq(\Omega_1 t)$ in mixer 12, and the output of mixer 61, i.e., $d_1(t)d_2(t)$ rather $d_2(t)$ phase modulates $sq(\Omega_2 t)$ in mixer 14. The outputs of mixers 12 and 14 are fed to unit 15. The output of transmitter 60 may be expressed as $$X''(t) = \sqrt{2P} \sin [\, \Omega_c t + \theta_1 a_1(t) + \theta_2 d_1(t) a_2(t)\, ],$$

and the powers of the four components $P_1$, $P_2$, $P_c$ and $P_L$ are identical to those of the first embodiment of the invention.

As seen from FIG. 6, the receiver 65 of the instant embodiment is nearly identical with receiver of the previously described embodiment, as shown in FIG. 4. The only difference is that in receiver 65 an additional mixer 66 is required. It mixes the quadrature channel output with $sq(\Omega_1 t)$ before it is supplied to mixer 53.

Thus, the output of mixer 66 is $$\sqrt{P_c}\, sq(\Omega_1 t) + \sqrt{P_2}\, d_2(t)\, sq(\Omega_2 t)$$

and the output of mixer 53 is $$\sqrt{P_c}\, sq(\Omega_1 t) sq(\Omega_2 t) + \sqrt{P_2}\, d_2(t).$$

As in the previously described embodiment the output of bit integrator 54 is $\hat{d}_2(t)$, since the first term will integrate to zero.

In receiver 65 the main channel output is $$\sqrt{P_1}\, d_1(t)\, sq(\Omega_1 t) + \sqrt{P_L}\, d_1(t)\, d_2(t)\, sq(\Omega_2 t).$$

After it is mixed with $sq(\Omega_1 t)$ in mixer 51, the output of the latter is $$\sqrt{P_1}\, d_1(t) + \sqrt{P_L}\, d_1(t)\, d_2(t)\, sq(\Omega_2 t)\, sq(\Omega_1 t).$$

When this output is integrated in integrator 52 over the high-rate data period $T_1$, the second term integrates to zero since the frequency $\Omega_1$, i.e., the frequency of the high-rate channel subcarrier is much higher than $1/T_1$. Thus the output of integrator 52 is $\hat{d}_1(t)$.

It should be stressed that in the present embodiment since the term $$\sqrt{P_L}\, d_1(t)\, d_2(t)\, sq(\Omega_2 t)\, sq(\Omega_1 t)$$

integrates to zero in integrator 52 irrespective of the frequency $\Omega_2$, the latter need not be chosen to be an integer multiple of the high-rate data as in the previously described embodiment. Thus $sq(\Omega_2 t)$ is independent of $T_1$. However, such independence is accomplished in the instant embodiment at the price of an additional mixer 66.

The advantages of the present invention will now be highlighted by comparing the prior art with the present invention. In both the prior art system and the present invention, the total power is the sum of four components expressed as $$P = P_1 + P_2 + P_c + P_L.$$

The system performance depends on the power in the data channels ($P_1$ and $P_2$) and requires some unmodulated power ($P_c$) for tracking purposes. The crossmodulation loss ($P_L$) as well as any unmodulated power above what is required for tracking represent wasted power. In the prior art system $P_L$ can be expressed as $$P_L = P_1 P_2 / P_c$$

The best performance is achieved when $$P_c = \sqrt{P_1 P_2} = P_L.$$

The result is that $P_c$ is, in general, larger than actually needed for tracking purposes. Also, since $P_1 > P_c$, the crossmodulation power loss $P_L$ is greater than the power in the second data channel $P_2$. The excess $P_c$ as well as $P_L$ represent wasted power and reduce the efficiency of the system. It should be stressed that any other choice of $P_c$ will further degrade the performance of the system.

In the present invention, $P_L$ can be expressed as $P_L = P_c P_2 / P_1$. Thus, $P_c$ can be chosen to satisfy the carrier requirement for tracking, and $P_L$ is smaller than both $P_c$ and $P_2$, i.e., $P_L$ is the smallest of the four power components. Therefore, the present invention reduces both the excess carrier power, and the crossmodulation loss which results in more power in the data channels and accordingly, a better performance of the system. It should be noted that as far as system performance is concerned, the two embodiments of the present invention are identical.

Figure 3:
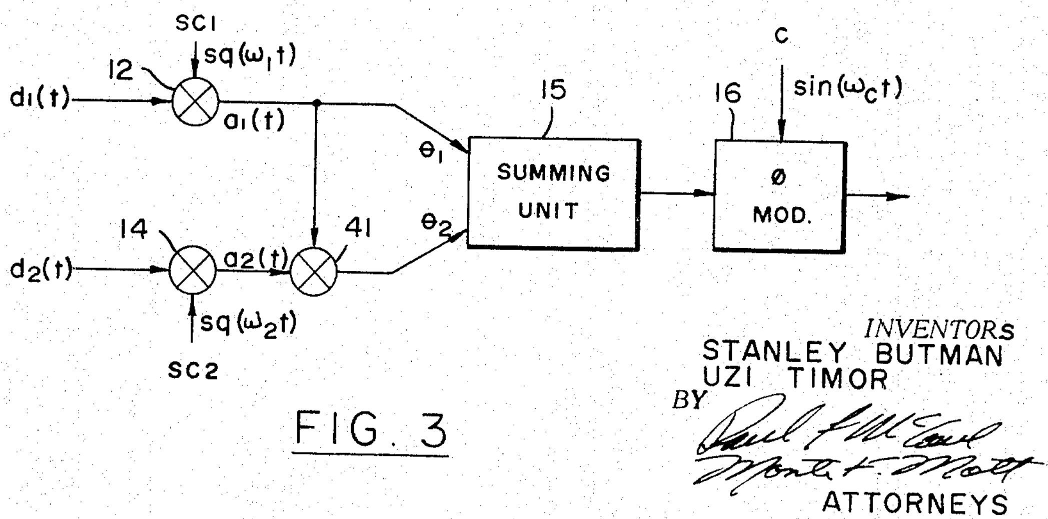
FIGS. 3 and 4 are block diagrams of a transmitter and receiver respectively of one embodiment of a two-channel telemetry system of the invention.

From the foregoing it should thus be apparent that in accordance with the teachings of this invention in the novel transmitter a signal is produced, which is at least a function of the product of the high-rate data $d_1(t)$, the low-rate data $d_2(t)$, and the low-rate channel subcarrier $sq(\Omega_2 t)$. Such a signal is the output of mixer 14 in FIG. 5. The output of mixer 41 in FIG. 3 is in addition also a function of the subcarrier of the high-rate channel $sq(\Omega_1 t)$. Such a signal when received by either receiver of the present invention enables the low-rate data to be detected off the quadrature channel output.

Figure 7:
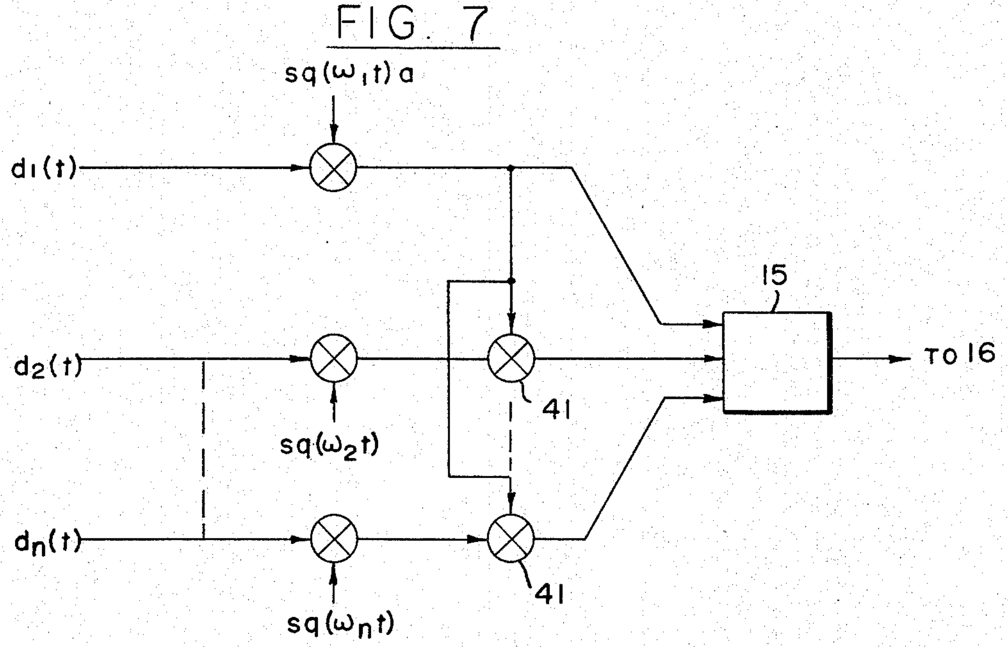
FIGS. 7 and 8 are blocked diagrams of a transmitter and receiver respectively of one embodiment of a multichannel telemetry system in accordance with the invention.
Figure 8:
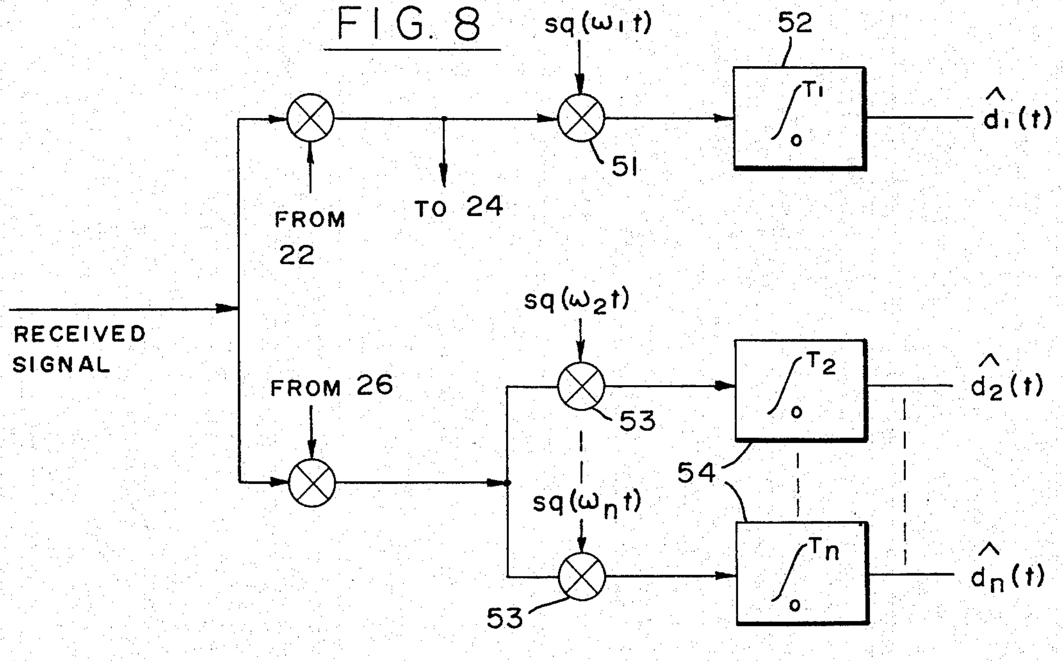

Although herebefore the teachings of the invention have been described in conjunction with only two-channel telemetry systems, the teachings are not limited thereto. They are further applicable to any $n$ channel telemetry system in which $n$ is an integer greater than 2, and in which a first channel is supplied with high-rate data and each of the other channels with data at a rate lower than the rate of the data in the first channel. In the transmitter embodiment of FIG. 7, for each low-rate channel a separate mixer 41 is provided which mixes $a_1(t)$ with $a_n(t)$ where $n$ is any channel except the high-rate channel. In the receiver for such an $n$ channel system for each low-rate channel, a separate mixer 53 (see FIG. 8) and an integrator 54 are provided. The data of all the low-rate channels is detected on the quadrature channel output.

Similarly, the embodiment shown in FIGS. 5 and 6 may be expanded to an $n$ channel system, by providing a separate mixer 61 for each low-rate channel. Each such mixer mixes $d_1(t)$, i.e., the high-rate data with the low-rate data of the particular low-rate channel and the output of this mixer is then phase modulated by the low-rate channel's subcarrier.

Herebefore the invention has been described in conjunction with a multichannel system in which one channel is used for high-rate data and the other channels for data at lower rates. Also the power $P_1$ of the high-rate data channel was assumed to be greater than the power in any of the other channels. This was done for explanatory purposes only. The teachings are equally applicable to systems in which the rates of data of all channels are the same and/or in which the power in the various channels is the same.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a transmitter of a multichannel telemetry system of the type including a carrier, at least a first channel and a second channel to which data is supplied, each channel having a subcarrier, the arrangement comprising:

first means for mixing the data supplied to said first channel with the first channel subcarrier and for providing an output which is a function of the product of said first channel subcarrier and said first channel data;

second means for providing an output which is a function of the product of at least the data supplied to said first channel the data supplied to said second channel and a subcarrier of said second channel; and third means responsive to the outputs of said first and second means for phase modulating a preselected carrier therewith.

2. The arrangement as recited in claim 1 wherein said second means includes means for mixing the data supplied to said first channel with the data supplied to said second channel and for mixing the product of the data supplied to said first and second channels with the subcarrier of said second channel.

3. The arrangement as recited in claim 2 wherein said third means includes means for summing the outputs of said first and second means and phase-modulating means for phase modulating the carrier with the summed output of said first and second means.

4. The arrangement as recited in claim 1 wherein said second means includes first mixing means for mixing the subcarrier of said second channel with the data of said second channel to produce a product thereof and second mixing means for mixing the product from said first mixing means with the output of said first means.

5. The arrangement as recited in claim 4 wherein said third means includes means for summing the outputs of said first and second means and phase-modulating means for phase modulating the carrier by the summed output of said first and second means.

6. In a receiver of a multichannel telemetry system in which a transmitter with a subcarrier for each channel transmits a signal including a first component which is a function of at least the product of data of a first channel data of a second channel and the second subcarrier frequency, an arrangement comprising:

first receiving means for receiving said transmitted signal and for providing a first output on a receiver inphase channel and a second output on a receiver quadrature channel; and second means responsive to said receiver quadrature channel output for detecting the data of said second channel therefrom.

7. The arrangement as recited in claim 6 wherein said transmitted signal includes a second component which is a function of the data of said first channel and the first channel subcarrier frequency and said receiver includes third means responsive to said first output for detecting the data of said second channel therefrom.

8. The arrangement as recited in claim 7 wherein said second means includes means for sequentially mixing said quadrature channel output with said second channel subcarrier frequency and said first channel subcarrier frequency in the detection of the data of said second channel.

9. The arrangement as recited in claim 7 wherein said first component is a function of the data of said first and second channels and the frequencies of said first and second channel subcarriers.

10. The arrangement as recited in claim 9 wherein said second means includes a mixer for mixing said quadrature channel output with said second channel subcarrier frequency.

11. In a transmitter of a multichannel telemetry system of the type to which high-rate data is supplied to a high-rate channel and low-rate data is supplied to at least one other low-rate channel, each channel having a subcarrier and said system including a carrier, the arrangement comprising:

first means for providing a product of the high-rate channel subcarrier with said high-rate data;

second means for providing an output which is a function of the product of at least said high-rate data, said low-rate data and the subcarrier of said at least one other low-rate channel; and third means responsive to the outputs of said first and second means for phase modulating said carrier with the outputs of said first and second means.

12. The arrangement as recited in claim 11 wherein said second means includes means for mixing said high-rate data and said low-rate data and for mixing the product of said high-rate data and said low-rate data with said subcarrier of said at least one other low-rate channel.

13. The arrangement as recited in claim 12 wherein said third means includes means for summing the outputs of said first and second means and phase modulating means for phase modulating the carrier with the summed outputs of said first and second means.

14. The arrangement as recited in claim 11 wherein said second means includes first mixing means for mixing the subcarrier of said at least one other low-rate channel with said low-rate data and second mixing means for mixing the output of said first means, with the output of said first mixing means.

15. The arrangement as recited in claim 14 wherein said third means includes means for summing the outputs of said first and second means and phase modulating means for phase modulating the carrier with the summed outputs of said first and second means.

16. In a receiver of a multichannel telemetry system in which a transmitter transmits a signal including a first component which is a function of at least the product of high-rate data, first low-rate data and the frequency of a first low-rate channel subcarrier, an arrangement comprising:

first receiving means for receiving said transmitted signal and for providing a first output on a receiver inphase channel and a second output on a receiver quadrature channel; and second means responsive to said receiver quadrature channel output for detecting said first low-rate data therefrom.

17. The arrangement as recited in claim 16 wherein said transmitted signal includes a second component which is a function of said high-rate data and the frequency of a high-rate channel subcarrier and said receiver includes third means responsive to said first output for detecting the high-rate data therefrom.

18. The arrangement as recited in claim 17 wherein said second means includes means for sequentially mixing said quadrature channel output with the frequencies of said first low-rate channel subcarrier and said high-rate channel subcarrier in the detection of said first low-rate data.

19. The arrangement as recited in claim 17 wherein said transmitted signal includes at least a third component which is a function of at least the product of said high-rate data, a second low-rate data and the frequency of a second low-rate channel subcarrier and said receiver includes fourth means responsive to said quadrature channel for detecting said second low-rate data therefrom.

20. The arrangement as recited in claim 17 wherein said first component is a function of the product of said high-rate data, said first low-rate data, the frequency of said first low-rate channel subcarrier and the frequency of said high-rate channel subcarrier.

21. The arrangement as recited in claim 20 wherein said second means includes a mixer for mixing said quadrature channel output with the frequency of said first low-rate channel subcarrier.

* * * * *